United States Patent [19]

Tran

[11] Patent Number: 5,325,395

[45] Date of Patent: Jun. 28, 1994

[54] 5-VOLT LOW LEVEL SERIAL TRANSCEIVER

[75] Inventor: Trung H. Tran, San Diego, Calif.

[73] Assignee: The United States of America as represented by the Secretary of the Navy, Washington, D.C.

[21] Appl. No.: 861,411

[22] Filed: Mar. 31, 1992

[51] Int. Cl.$^5$ .............................. H04B 1/38
[52] U.S. Cl. .............................. 375/7; 375/36
[58] Field of Search ................ 375/7, 8, 36; 455/127, 455/73; 379/338, 349; 370/26, 32

[56] References Cited

U.S. PATENT DOCUMENTS

| | | | |
|---|---|---|---|
| 4,254,501 | 3/1981 | Griffith et al. | 375/36 |
| 4,493,092 | 1/1985 | Adams | 375/7 |
| 4,631,733 | 12/1986 | Spiesman | 375/7 |
| 4,698,800 | 10/1987 | Cavaliere et al. | 375/7 |
| 4,754,477 | 6/1988 | Tanaka et al. | 375/7 |

*Primary Examiner*—Stephen Chin
*Assistant Examiner*—Don N. Vo
*Attorney, Agent, or Firm*—Harvey Fendelman; Thomas Glenn Keough

[57] ABSTRACT

A transceiver has a transmitter portion using active comparators coupled to a single low level positive bias source to enable low powered drain transmit and receive conversion of TTL input signals to LLS (low level serial) data output signals for a coaxial data transmission cable. The transceiver also provides a constant impedance for a coaxial or triaxial transmission cable during active transmission periods, standby periods and power-off periods to provide a cost effective method to transmit and receive data.

6 Claims, 1 Drawing Sheet

5-VOLT LOW LEVEL SERIAL TRANSCEIVER

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATION

This patent application is continuing application of co-pending United States Patent and Trademark Office application Ser. No. 07/695,039 entitled "Low Level Serial Transceiver" by Trung H. Tran and hereby incorporates by reference herein all documents and references thereof.

BACKGROUND OF THE INVENTION

Frequently a requirement for transceiver circuits that are coupled to a coaxial cable is to provide a constant impedance for the cable at all times to maintain the integrity of the communication system. This requirement becomes more exacting when a transceiver of this type is remotely deployed for long periods of unattended operation when the need for low power consumption becomes evident. Usually such transceivers are one of a number of like transceivers in an interrelated network which is designed to share the transceiver function with a host of other related electronic functions. A frequent design hurdle attendant such arrangement is that the various electronic functions might be provided in compact, integrated circuits or microminiaturized packages where the heat dissipation problems associated with undue, high power consumption can and do impose severe operational limitations.

One contemporary transceiver that operates in the standby mode sinks 110 milliamps from its positive power supply and about 88 milliamps from its negative power supply. High power requirements from the negative supplies frequently are drawn upon to assure the reliable actuation and responsive operation of the transceivers. These increased power consumption levels are largely attributed to the design complexity of the contemporary transceivers which is also reflected in a considerably increased cost per unit. While the above identified invention sets forth an improvement in the state of the art, even lower power consumption levels are desirable.

Thus, there is a continuing need in the state of the art for transceiver improvement that provides for a still lower power consumption which assures the presentation of substantially the same impedance to a coaxial cable not only during transmission but also during the standby and power off modes of receiver operation.

SUMMARY OF THE INVENTION

The present invention is directed to providing an improved low power level serial transceiver requiring only a single positive voltage source that additionally provides a substantially constant characteristic impedance during active mode, stand-by mode and power-off mode operation. An isolator portion connected to said cable is provided with a fixed impedance appropriately coupled to provide the constant impedance during operation in said active mode, stand-by mode and power-off mode. A transmitter portion connected to said isolator portion receives two separate TTL data streams having means actuated by receiving the two separate TTL data streams for amplifying the two separate TTL data streams to convert the information thereof into representative LLS signals during operation in the active mode at a predetermined amplitude. A receiver portion connected to the isolator portion has a comparator circuit coupled to receive LLS data signals of a predetermined magnitude during operation in the stand-by mode for converting the received LLS signals to representative TTL signals. A single power source of positive polarity only, is coupled to the transmitter portion and the receiver portion to enable the operation thereof in the active and stand-by mode.

An object of the invention is to provide a power efficient low level serial transceiver.

Another object is to provide a more power efficient serial transceiver relying on a single positive power supply.

Another object is to provide a more power efficient serial transceiver relying on a single positive 5-volt power supply.

Yet another object is to provide a serial transceiver providing a substantially constant line impedance at all times while drawing upon a single positive power supply.

Yet another object is to provide a serial transceiver providing a substantially constant line impedance at all times while drawing upon a single positive 5-volt power supply.

These and other objects of the invention will become more readily apparent from the ensuing specification and claims when taken in conjunction with the appended drawings.

DESCRIPTION OF THE PREFERRED EMBODIMENT

Figure 1:
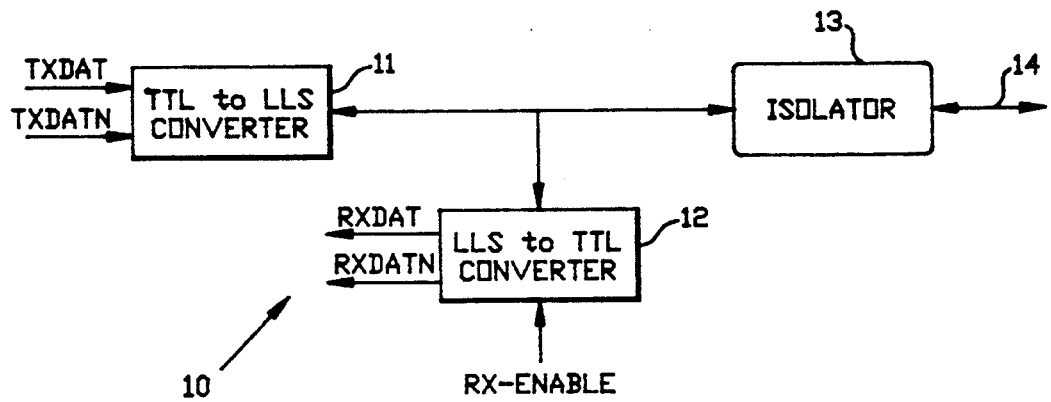
FIG. 1 is a functional block diagram representation invention.

Referring now to FIG. 1 of the drawings a low level serial transceiver 10 includes a transmitter portion 11 and a receiver portion 12 coupled by an isolator portion 13 to a triaxial or coaxial data transmission cable 14. TTL (transistor-transistor logic) signals (0 to 5 volt signals) and LLS (low-level serial) signals (low level serial signals of approximately +/−800 millivolts) can be accommodated by the constituents to be herein described. The cable extends to remote portions of a communications system and may be interconnected to a number of other low level serial transceivers fabricated in accordance with this inventive concept to provide an inexpensive yet cost effective method of utilizing, for example, coaxial or triaxial cables to transmit and receive 10 megabit Manchester coded data, for example.

A constant characteristic impedance is presented for cable 14 while transceiver 10 is operating in the active mode (transmitting), standby mode (receiving or awaiting the next message), or when the transceiver 10 is powered off. This constant characteristic impedance can be characterized as an impedance of 50 ohms±2 ohms at the isolator portion 13 is measured from between 10 MHz to 50 MHz to assure that no more than 10 percent of a 10 MHz input signal is reflected.

Figure 2:
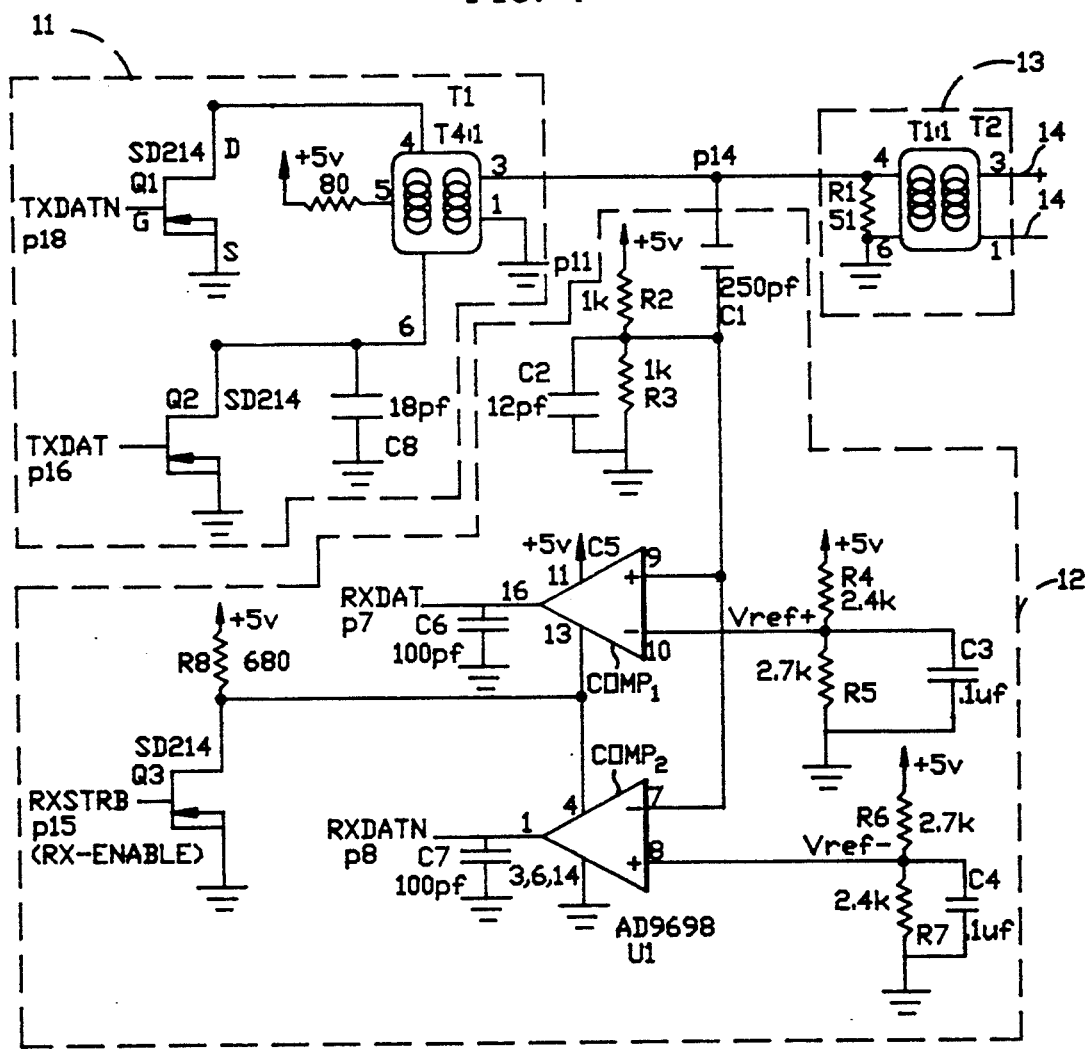
FIG. 2 sets forth a schematic representation of the constituents of the invention.

Referring now in part to FIG. 2, when the active mode (transmitting mode) is invoked, a TTL to LLS converter 11 is enabled. During this active mode operation, a pair of field effect transistors (FETS) transistors Q1 and Q2 encode the two TTL input signals (TXDAT and TXDATN) to a representative single ended tri-level signal (+v, −v and ground). This tri-level signal is coupled to transformer T2 to provide at the LLS interface, isolator 13, a differential output signal that is capable of driving a 50-ohm load at the distal end of cable 14. When converter 11 of transceiver 10 is in the transmitting mode, receiver portion 12 is disabled by an RX-ENABLE signal. With the resistance of R1 being equal to approximately 50 ohms, the impedance looking into the transceiver from the interconnecting end of cable 14 is approximately equal to 50 ohms.

When transceiver 10 is in the standby mode (receiving or standing-by), receiver portion 12 is enabled by RX-ENABLE signal and the transmitter portion 11 is disabled due to the absence of transmitting data. When receiving, the received LLS signal from isolator portion 13 is AC coupled by capacitor C1 to comparators $COMP_1$ and $COMP_2$, appropriately interconnected and suitably provided operational amplifiers, of receiver portion 12. The capacitor C1 couples received LLS data signals from the isolator portion 13 to a 2.5 volt DC, the bias voltage of the comparators, coming from a voltage divider made up of R2 and R3. Since receiver portion 12 has been fabricated not to allow the recognition of signals that are less than 260 millivolts peak to peak, the thresholds of the comparators, $V_{ref+}$ and $V_{ref-}$, are set to 2.63 volts and 2.37 volts, respectively. The outputs of the comparators are TTL signals. Since the resistance of R1 is approximately equal to 50 ohms, the impedance looking into the transceiver from the interconnecting end of cable 14 while in the standby mode is approximately equal to 50 ohms.

When transceiver 10 is powered off (the power-off mode) and resistance R1 is equal to approximately 50 ohms, the impedance looking into the transceiver from the interconnecting end of cable 14 is equal to approximately 50 ohms.

The transceiver requires only a 5-volt power supply coupled in common to the points indicated in FIG. 2 to operate and consume only 250 milliwatts of power as opposed to other transceivers which require at least +5 volts and −5 volts power supplies, which can consume as much as 1400 milliwatts of power. This lower power consumption rate of the single positive source represents a savings of about 82 percent power when compared to contemporary transceivers. The inclusion of a negative source would otherwise substantially double the power utilization requirement, increase the space requirement, and add to the problems associated with additional heat dissipation. This power savings provides for greater longevity for remotely unattended stations and greatly reduces the power dissipation which might otherwise compromise associated integrated circuits.

The power savings is attributed to the simplicity of the design which makes this transceiver rely on lower power consumption levels. The components for the design of this circuit were selected to assure the use of less power and for increased reliability. The simplicity and power consumption level of this transceiver reflect a reduced cost per unit and cost of operation.

Obviously, many modifications and variations of the present invention ar possible in the light of the above teachings. It is therefore to be understood that within the scope of the appended claims, the invention may be practiced otherwise than as specifically described.

What is claimed is:

1. A low level serial digital transceiver presenting a constant impedance to a cable during active mode, stand-by mode and power-off mode operation and using reduced power in the active and stand-by mode comprising:

an isolator portion coupled to said cable having a fixed impedance connected to provide said constant impedance during operation in said active mode, stand-by mode and power-off mode;

a transmitter portion connected to said isolator portion and coupled to receive two separate transistor-transistor logic data streams having means actuated by receiving said two separate transistor-transistor logic data streams for amplifying said two separate transistor-transistor logic data streams to convert the information thereof into representative low-level serial signals during operation in said active mode at a predetermined amplitude during operation in said active mode;

a receiver portion connected to the isolator portion and having a comparator circuit coupled to receive low-level serial data signals from said isolator portion of a predetermined magnitude during operation in said stand-by mode to convert received said low-level serial data signals to representative transistor-transistor logic signals; and a single power source of positive polarity only, being coupled to said transmitter portion and said receiver portion to enable the operation thereof in the active and stand-by mode.

2. A low level serial digital transceiver according to claim 1 in which said comparator circuit includes two parallel connected operational amplifiers connected to a voltage divider to establish said predetermined magnitude and the amplifying means of said transmitter portion includes a pair of field effect transistors each coupled to receive one of said two separate transistor-transistor logic data streams.

3. A low level serial digital transceiver according to claim 1 in which said cable is a coaxial date transmission cable.

4. A low level serial digital transceiver according to claim 2 in which said cable is a coaxial date transmission cable.

5. A low level serial digital transceiver according to claim 3 in which said isolator portion is a coupling transformer.

6. A low level serial digital transceiver according to claim 4 in which said isolator portion is a coupling transformer.

* * * * *